United States Patent
Tachibana et al.

(10) Patent No.: US 6,601,822 B2
(45) Date of Patent: Aug. 5, 2003

(54) ELECTROMAGNETIC DRIVING DEVICE, FLUID CONTROL VALVE HAVING SAME AND METHOD OF MANUFACTURING SAME

(75) Inventors: Seiji Tachibana, Kariya (JP); Hiroyuki Nakane, Okazaki (JP); Mitsuhiro Watanabe, Obu (JP); Naoya Suda, Chita-gun (JP); Yoshitaka Kamiya, Anjo (JP)

(73) Assignee: Denso Corporation, Kariya (JP)

( * ) Notice: Subject to any disclaimer, the term of this patent is extended or adjusted under 35 U.S.C. 154(b) by 40 days.

(21) Appl. No.: 09/799,625

(22) Filed: Mar. 7, 2001

(65) Prior Publication Data
US 2001/0022474 A1 Sep. 20, 2001

(30) Foreign Application Priority Data
Mar. 17, 2000 (JP) .................................... 2000-075437

(51) Int. Cl.⁷ ............................................... F16K 31/02
(52) U.S. Cl. ........................... 251/129.15; 137/625.69; 335/236; 335/281
(58) Field of Search ................. 251/129.15; 137/625.65, 137/625.69, 569.17; 335/236, 281, 297

(56) References Cited

U.S. PATENT DOCUMENTS

| | | | |
|---|---|---|---|
| 2,853,659 A | | 9/1958 | Herion |
| 4,233,583 A | * | 11/1980 | Novacek ..................... 335/236 |
| 4,486,053 A | | 12/1984 | Hawker et al. |
| 4,838,954 A | * | 6/1989 | Perach .................. 137/625.65 |
| 4,919,390 A | * | 4/1990 | Ichiryu et al. ......... 251/129.15 |
| 4,920,009 A | | 4/1990 | Lee et al. |
| 4,971,291 A | * | 11/1990 | Cristiani et al. ..... 251/129.15 X |
| 5,218,999 A | * | 6/1993 | Tanimoto ................ 137/625.65 |
| 5,608,369 A | * | 3/1997 | Irgens et al. ................. 335/281 |
| 5,769,391 A | | 6/1998 | Noller et al. |
| 6,206,038 B1 | * | 3/2001 | Klein et al. ............. 137/596.17 |

FOREIGN PATENT DOCUMENTS

| | | |
|---|---|---|
| DE | 19727414 A | 1/1999 |
| EP | 0233166 A | 8/1987 |
| JP | 7-189852 | 7/1995 |
| JP | 8-330131 | 12/1996 |

OTHER PUBLICATIONS

Patent Abstracts of Japan, vol. 006, No. 176 (E–130), Sep. 10, 1982 & JP 57 092806 A (CKD Controls Ltd), Jun. 9, 1982.
Patent Abstracts of Japan, vol. 010, No. 376 (E–464), Dec. 13, 1986 & JP 61 168215 A (Diesel Kiki Co Ltd), Jul. 29, 1986.

\* cited by examiner

Primary Examiner—Ehud Gartenberg
Assistant Examiner—Eric Keasel
(74) Attorney, Agent, or Firm—Nixon & Vanderhye P.C.

(57) ABSTRACT

In a magnetic driving device, a fixed core has a housing portion, in which a plunger is housed to reciprocatingly move, and an attracting portion toward which the plunger is attracted upon energizing a coil. The housing portion is provided with a ring portion, which is formed by machining an outer circumference wall thereof and whose thickness is thinner than that of a part of the housing portion adjacent to the ring portion to an extent that mechanical strength of the housing portion is not damaged. The ring portion is provided with a plurality of through-holes penetrating radially the wall thereof. A magnetic flux area of the ring portion is limited due to the thin wall and the through-holes so that magnetic resistance is enlarged.

5 Claims, 4 Drawing Sheets

ELECTROMAGNETIC DRIVING DEVICE, FLUID CONTROL VALVE HAVING SAME AND METHOD OF MANUFACTURING SAME

CROSS REFERENCE TO RELATED APPLICATION

This application is based upon and claims the benefit of priority of Japanese Patent Application No. 2000-75437 filed on Mar. 17, 2000, the content of which is incorporated herein by reference.

BACKGROUND OF THE INVENTION

1. Field of the Invention

The present invention relates to an electromagnetic driving device in which a housing portion receiving a movable element and an attracting portion attracting the movable element are integrally formed, a fluid control valve having the electromagnetic driving device and a method of manufacturing the electromagnetic driving device.

2. Description of Related Art

In a conventional electromagnetic driving device having a fixed core in which a housing portion receiving a movable element and an attracting portion attracting the movable element are formed with separate pieces, axial centers of housing portion and the attracting portion are likely to be offset due to their assembly errors. Therefore, not to disturb a reciprocal movement of the movable element even if the axial centers of the housing and attracting portions are offset to a certain extent, radial air gaps between the housing portion and the movable element and between the attracting portion and the movable element are larger by an offset amount of the axial centers thereof. Since larger air gap causes a reduction of attracting force, a greater coil winding turn is required to secure a predetermined attracting force. Increasing the coil winding turn makes a body of the electromagnetic driving device larger.

To eliminate the offset of the axial centers of the housing and attracting portions, as disclosed in JP-A-11-500509 and JP-A-7-189852, is known an electromagnetic driving device in which the housing and attracting portions are integrally formed, for example, by machining. However, when the housing and attracting portions are integrally formed, magnetic flux generated upon energizing the coil are likely to pass directly between the housing portion and the attracting portion, not through the moving element so that the attracting force is limited.

A valve disclosed in JP-A-11-500509 is provided between the housing and attracting portions with a thin thickness throttling portion having a narrow area through which magnetic flux pass for enlarging magnetic resistance. The throttling portion serves to limit the magnetic flux passing directly between the housing portion and the attracting portion so that the attracting force of the movable element may be secured.

To limit the magnetic flux passing directly between the housing and attracting portions to an extent that the attracting force is sufficiently secured, the thickness of the throttling portion has to be remarkably thin. Because of this thin thickness, a mechanical strength of the throttle portion is weak. The housing portion may thus be damaged.

Further, an electromagnetic actuator disclosed in JP-A-7-189852 is provided in a part of the housing portion with a non-magnetic material portion for enlarging the magnetic resistance. In this case, if the non-magnetic material portion is formed by diffusing the non-magnetic material, for example, by laser radiation, a surface of the non-magnetic material portion tends to be rough. As the non-magnetic portion in the actuator disclosed in JP-A-7-189852 is not in slidable contact with the moving element, the movement of the movable element is not disturbed even if an inner circumferential wall of the non-magnetic portion is rough. However, in the electromagnetic actuator in which the non-magnetic material portion comes in slidable contact with the movable element, the rough surface of the non-magnetic portion causes likely to disturb a smooth movement of the movable element.

SUMMARY OF THE INVENTION

An object of the invention is to provide an electromagnetic driving device that is compact and generates a large attracting force without damaging a housing portion of a fixed core.

It is another object of the invention to provide a fluid control valve having the electromagnetic driving device in which a driving force to a movable element is stronger without enlarging a body thereof.

Further, it is a further object to provide a method of manufacturing the electromagnetic driving device.

To achieve the above objects, in an electromagnetic driving device having a coil, a movable element, and a fixed element having a housing portion in which the movable element is housed to reciprocatingly move, and an an attracting portion toward which the movable element is attracted by magnetic flux to be generated upon energizing the coil, the housing portion is provided at a position radially opposed to the movable element with a ring portion, and the housing portion and the attracting portion are integrally formed. With the device mentioned above, the ring portion is provided with at least one of through-holes radially penetrating a wall thereof.

As the housing and attracting portions are integrally formed and worked continuously by machining. Accordingly, the offset of the axial centers of the housing and attracting portions may be eliminated. This will result in minimizing radial air gaps between the housing portion and the movable element and between the attracting portion and the movable element so that an attracting force between the attracting portion and the movable element may be increased.

Further, one or more through-holes are formed to enlarge magnetic resistance of the ring portion so that magnetic flux flowing directly between the integrally formed housing and attracting portions is limited. The magnetic resistance may be increased by adjusting a number and each diameter of the through-holes without reducing a thickness of the ring portion. Therefore, a mechanical strength of the housing portion is assured and the housing portion is prevented from being damaged.

Instead of one or more of the through-holes, the ring portion may be provided on inner or outer circumferential surface with one or more recesses or ring shaped grooves for enlarging magnetic resistance of the ring portion. The magnetic resistance may be increased by adjusting a number, each depth and largeness (width) of the recesses or ring shaped grooves without reducing a thickness of the ring portion.

Further, to enlarge magnetic resistance of the ring portion, the ring portion may be provided on an outer circumferential surface with a non-magnetic diffusion layer. Since non-magnetic material is not diffused on an inner circumferential surface of the ring portion, the inner circumferential surface of the ring portion is not rough but smooth so that a smooth slidable movement between the movable element and the ring portion may be assured.

Furthermore, to enlarge magnetic resistance of the ring portion, the ring portion is provided with a non-magnetic substance formed by inducing strains in metallographycal structure of the ring portion, for example, based on work hardening by pressing.

It is preferable that a thickness of the wall of the ring portion is thinner that that of the housing portion axially adjacent thereto to an extent that a mechanical strength of the ring portion is not damaged practically. This will contribute to enlarge magnetic resistance of the ring portion, too.

As a method of manufacturing the magnetic driving device, it is preferable that after forming one or more through-holes radially penetrating a wall of the ring portion, resin molding is executed on an outer circumferential surface of the fixed core including the ring portion, while the through-hole is closed with a blocking member abutting on an inner circumferential wall of the ring portion. As a result, resin is not leaked via the through-hole to an inside of the ring portion.

Further, it is another method that, after making a redial thickness of the ring portion thinner than that of a part of the housing portion axially adjacent thereto, resin molding is executed on an outer circumferential surface of the fixed core including the ring portion, while the ring portion is supported by a blocking member abutting on an inner circumferential wall of the ring portion so that the ring portion is prevented from deforming due to resin pressure.

BRIEF DESCRIPTION OF THE DRAWING

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF THE PREFERRED EMBODIMENTS

A plurality of preferred embodiments of the present invention are described with reference to drawings.
(First Embodiment)

Figure 1:
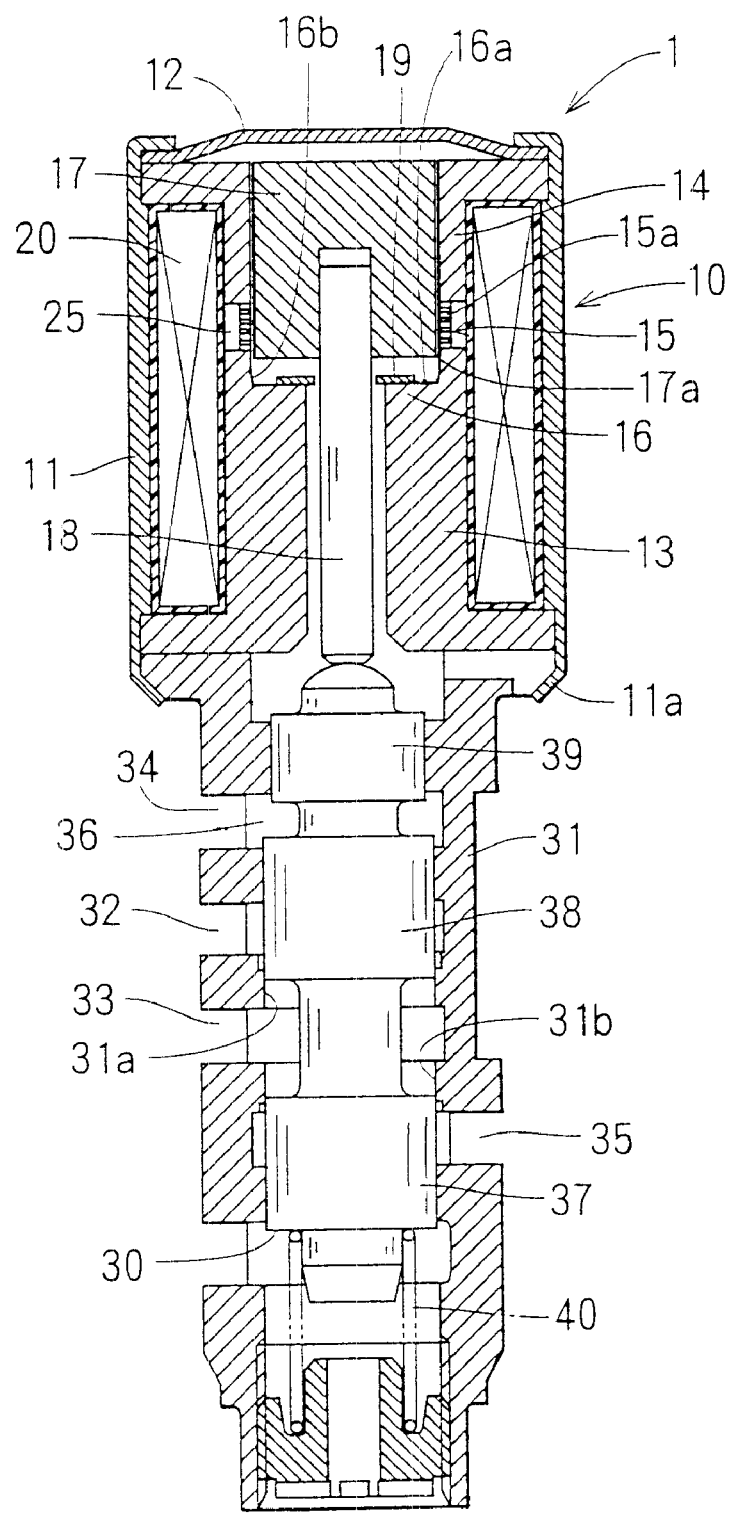
FIG. 1 is across sectional view showing a fluid control valve according to a first embodiment of the present invention.

FIG. 1 shows a fluid control valve according to a first embodiment of the present invention.

The fluid control valve 1 is a spool type hydraulic control valve for controlling operating oil to be supplied to a hydraulic control apparatus of an automatic transmission for a vehicle.

A linear solenoid 10, which serves as an electromagnetic driving device, is composed of a cylindrical yoke 11, an end plate 12, a fixed core 13, a plunger 17, a shaft 18 and a coil 20. The yoke 11, and end plate 12, a fixed core 13, a plunger 17, a shaft 18 and a coil 20, the yoke 11, the end plate 12 and the fixed core 13 constitute a fixed element and the plunger 17 and the shaft 18 constitute a movable element. The yoke 11, the end plate 12, the fixed core 13 and plunger 17 are made of magnetic material. The fixed core 13 is fixed between the end plate 12 and a spool housing 31, in which a spool 30 is slidably and reciprocatingly held, in such a manner that both ends of the yoke 11 crimp the respective circumferential peripheries of the spool housing 31 and the end plate 12.

The fixed core has a housing portion 14, in which the plunger is housed so as to reciprocatingly move, and an attracting portion 16, which generates a magnetic attracting force for attracting the plunger 17. To prevent the plunger 17 from being adhered to the housing portion 14, an inner circumferential surface of the housing portion 14 or an outer circumferential surface of the plunger is coated or plated with non-magnetic material.

Figure 2:
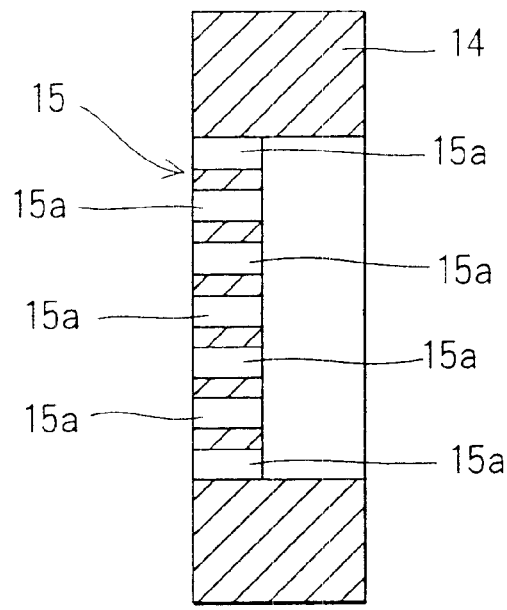
FIG. 2 is an enlarged view of a ring portion according to the first embodiment.

As shown in FIG. 2, the housing portion 14 is provided at a position facing radially the plunger 17 with a ring portion 15. The ring portion 15 is formed by machining in a ring shape an outer circumferential wall of the housing portion 14. A thickness of the ring portion 15 is thinner than that of the housing portion 14 axially adjacent thereto to an extent that a required mechanical strength of the housing portion 14 is not damaged. The ring portion 15 is provided with a plurality of radially penetrating through-holes 15a. As the ring portion 15 is thin and has a plurality of the through-holes 15a, an area of the ring portion 15 through which magnetic flux pass is narrowed and limited. The through-holes 15a are provided by laser radiation, machining, press working or water jet working.

As shown in FIG. 1, the attracting portion 16 has an opposing portion 16a, which is axially opposed to the plunger 17, and a taper portion 16b, which is located between the opposing portion 16a and the ring portion 15 whose diameter is smaller toward the opposing portion 16a. The plunger 17 is provided at an end thereof on a side of the opposing portion 16a with a taper portion 17a whose diameter is smaller toward the attracting portion 16.

The shaft 18 is press fitted into the plunger 17 and moves reciprocatingly together with the plunger 17. An end of the shaft 18 abuts on an end of the spool 30.

The coil 20 is formed in a cylindrical shape by resin molding and fixed by the yoke 11 and the fixed core 13. When current is supplied to the coil 20 from a terminal (not shown) connected in circuit with the coil 20, magnetic flux flows through a magnetic circuit constituted by the yoke 11, the plunger 17 and the fixed core 13 so than an attracting force is generated between the attracting portion 16 of the fixed core 13 and the plunger 17. Accordingly, the plunger 17 and the shaft 18 move downward in FIG. 1. The downward movement of the plunger 17 in FIG. 1 is restricted by a stopper 19.

The spool housing 31 holds the spool 30 so that the spool 30 moves reciprocatingly therein. The spool housing 31 is provided with an input port 32, an output port 33, a feedback port 34 and an ejecting port 35. Operating oil is supplied and input to the input port 32 by a pump from a tank (not shown), the operating oil is supplied to an engaging device of an automatic transmission (not shown) from the output port 33, the output port 33 is in communication with the feedback port 34 at a portion outside the fluid control valve 1 so that a part of operating oil which has flowed out from the output port 33 is introduced to the feedback port 34. The feedback port 34 is in communication with a feedback chamber 36. The operating oil is ejected from the ejecting port 35 to the tank.

The spool 30 is provided in order from an opposite side of the linear solenoid valve 10 with a large diameter land 37, a large diameter land 38 and a small diameter land 39. A diameter of the small diameter land 39 is smaller than that of the large diameter land 37 or 38. The spool 30 is always in contact with the shaft 18 of the linear solenoid 10. The movement of the plunger 17 is transmitted via the shaft 18 to the spool so that the spool 30 moves reciprocatingly in the spool housing 31.

A spring 40, which is disposed on an opposite side of the linear solenoid 10 and serves as a biasing mechanism for urging the spool 30 toward the linear solenoid 10.

The feedback chamber 36 is located between the large diameter land 38 and the small diameter land 39 to each of which a force responsive to an outer diameter thereof due to hydraulic oil in the feedback chamber 38 is applied. Accordingly, the hydraulic oil in the feedback chamber 38 urges the spool 30 in an opposite direction of the linear solenoid 10. Feedback of a part of the hydraulic oil output by the fluid control valve 1 serves to prevent output pressure from fluctuating due to a fluctuation of hydraulic pressure to be supplied or input. The spool 30 is at rest at a position where the biasing force of the spring 40 is balanced with a force of plunger 17 urging the spool 30 due to the electromagnetic attracting force generated in the fixed core 13 based on the current supplied to the coil and a force which the spool 30 receives from the hydraulic oil in the feedback chamber 36.

An amount of operating oil flowing from the input port 32 to the output port 33 depends on a seal length representing a length by which the an inner circumferential wall 31a of the spool housing 31 and an outer circumferential wall of the large diameter land 38 overlap each other. As the seal length is shorter, the amount of operating oil flowing from the input port 32 to the output port 33 increases. On the contrary, as the seal length is longer, the amount of operating oil flowing from the input port 32 to the output port 33 decreases. Similarly, an amount of operating oil flowing from the output port 33 to the ejecting port 35 depends on the seal length with respect to an inner circumferential wall 31b of the spool housing 31 and an outer circumferential wall of the large diameter land 37.

An operation of the fluid control valve 1 is described next.
(1) On De-energizing the Coil As shown in FIG. 1, when the coil 20 is not energized, the spool 30 is at least at a position where the biasing force of the spring 40 is balanced with a feedback force of the hydraulic oil. The input port 32 is in communication with the output port and the amount of operating oil flowing from the input port 32 to the output port 33 increases. As the ejecting port 35 is closed so that hydraulic pressure of the operating oil supplied to the automatic transmission shows maximum.
(2) On Energizing the Coil When the coil energized, the magnetic flux flowing between the housing and attracting portions 14 and 16 is limited since the ring portion 15 acts as the magnetic resistance. Accordingly, the magnetic flux flows between the housing portion 14 and the plunger 17 and between the taper portions 17a of the plunger 17 and 16b of the attracting portion 16. The magnetic flux passing directly between the housing and the attracting portions 14 and 16 not via the plunger 17 but via the ring portion 15 does not exert a force of attracting the plunger 17. As the magnetic flux is prevented from flowing directly between the housing and the attracting portions 14 and 16, the force of attracting the plunger 17 increases.

Upon energizing the coil 20, the plunger 17 is attracted to the attracting portion 16 against the biasing force of the spring 40 so that the spool 30 moves downward in FIG. 1. As the seal length with respect to the inner circumferential wall 31a and the larger diameter land 38 becomes longer and the inner circumferential wall 31b and the large diameter land 37 becomes shorter, the amount of operating oil flowing from the input port 32 to the output port 33 decreases and the amount of operating oil flowing from the output port 33 to the ejecting port 35 increases. Accordingly, hydraulic pressure of the operating oil flowing out from the output port 33 decreases.

On the contrary, when the spool 30 is moved toward the linear solenoid 10, the seal length with respect to the inner circumferential wall 31a and the larger diameter land 38 becomes shorter and the inner circumferential wall 31b and the large diameter land 37 becomes longer so that the amount of operating oil flowing from the input port 32 to the output port 33 increases and the amount of operating oil flowing from the output port 33 to the ejecting port 35 decreases. Accordingly, hydraulic pressure of the operating oil flowing out from the output port 33 increases.

In the fluid control valve 1, the linear solenoid 10 is operative to adjust a force of urging the spool 30 toward the linear solenoid 10 by controlling current to be supplies to the coil 20 so that hydraulic pressure of operating oil that has flowed out from the output port 33 is adjusted. As an amount of current supplied to the coil 20 increases, the electromagnetic attracting force of the attracting portion 16 increases in proportion to the current amount so that an urging force of the shaft 18 for moving the spool 30 in an opposite direction to the linear solenoid 10 increases. The spool 30 comes at rest at a position where the force acting from the plunger 17 to the spool 30 due to the electromagnetic attracting force and the force of urging the spool 30 in an opposite direction to the linear solenoid 10 due to the hydraulic pressure of feed backed operating oil are balanced with the biasing force of the spring 40. Accordingly, the hydraulic pressure of operating oil flowing out from the output port 33 decreases in proportion to the amount of current supplied to the coil 20.

Figure 3A:
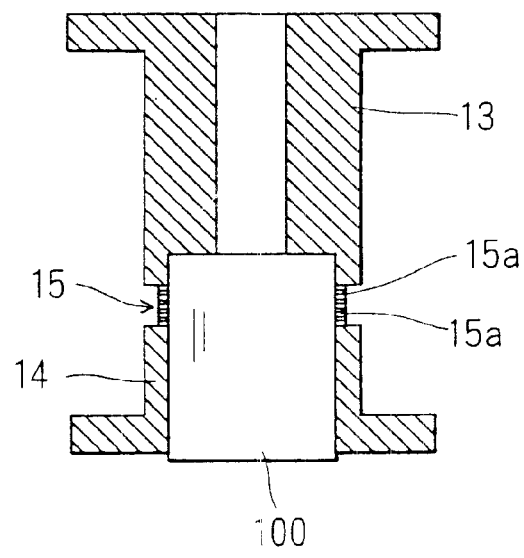
FIG. 3A is a cross sectional view of a fixed core before the fixed core is filled with resin for forming an inner circumference spool thereon according to a manufacturing method of the first embodiment.
Figure 3B:
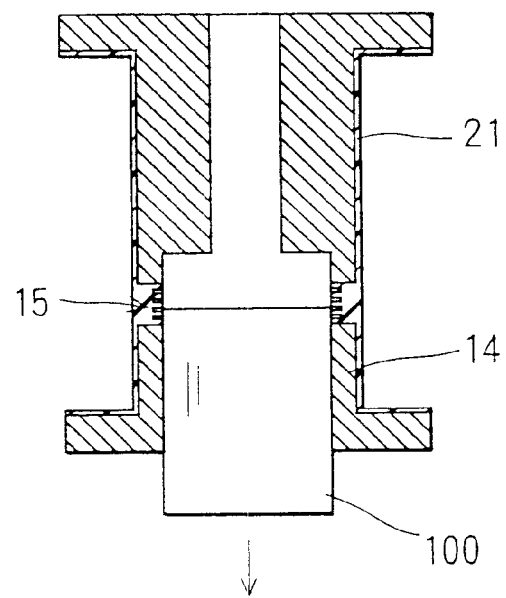
FIG. 3B is a cross sectional view of a fixed core after the fixed core is filled with resin for forming an inner circumference spool thereon according to the manufacturing method of the first embodiment.

Next, a method of manufacturing an inner circumference spool 21, on which the coil 20 is wound, around the fixed core 13 of the first embodiment. (1) As shown in FIG. 3A, the thin thickness ring portion 15 is provided with the through-holes 15a. A pin 100 is inserted into an inner circumference of the housing portion 14 to constitute a blocking member for closing openings of the through-holes 15a. (2) An outer circumference of the fixed core 13 is filled with resin so that the inner circumference spool on which the coil 20 is wound is formed. (3) After the resin has hardened, the pin 100 is pulled out, as shown in FIG. 3B. (4) After winding the coil 20 on the inner circumference spool 21, outer circumference of the oil 20 is further filled with resin.

(Modification 1)

Figure 4:
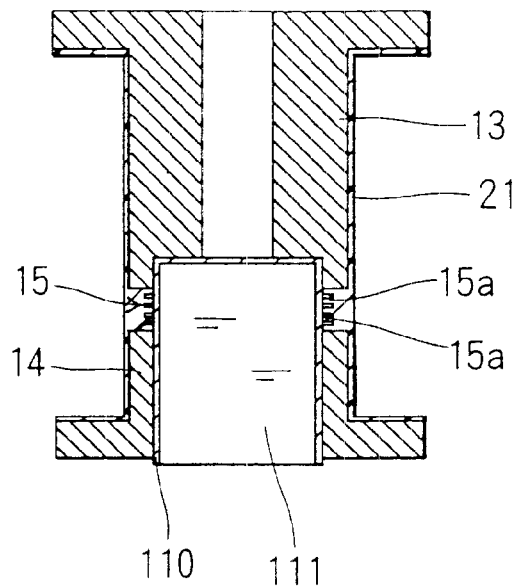
FIG. 4 is a cross sectional view of a fixed core after the fixed core is filled with resin for forming an inner circumference spool thereon according to a first modified manufacturing method.

A first modified method of manufacturing the inner circumference spool 21 is described with reference to FIG. 4. Instead of inserting the pin 100 into the housing portion 14, operating oil 111 is supplied to an inside of a cylindrical cap member 110 and a cylindrical side wall of the cylindrical cap member is held inside the housing portion 14 by hydraulic pressure of operating oil 111 so that a resin leakage from the through-holes 15a is prevented. The cylindrical cap member 110 and the operating oil 111 constitute the blocking member.

(Modification 2)

Figure 5:
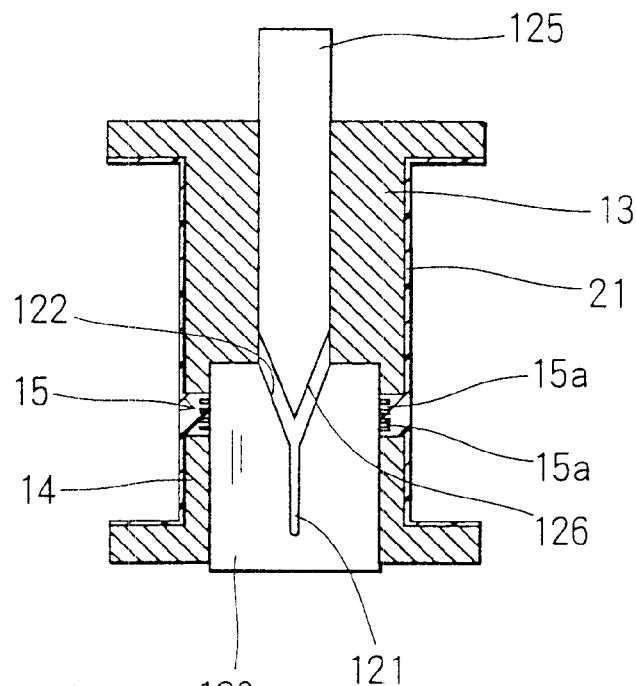
FIG. 5 is a cross sectional view of a fixed core after the fixed core is filled with resin for forming an inner circumference spool thereon according to a second modified manufacturing method.
Figure 6:
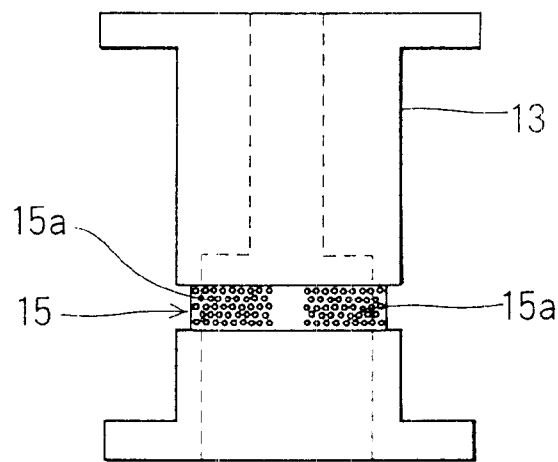
FIG. 6 is a front view showing an outer wall of the fixed core according to the second modified manufacturing method.

A second modified method of manufacturing the inner circumference spool 21 is described with reference to FIGS. 5 and 6.

(1) A pin 120 is inserted into the housing portion 14. An outer diameter of the pin 120 is nearly equal to or slightly smaller than an inner diameter of the housing portion 14. The pin 120 is provided with a slit 121 extending diametrically and axially and a tapered surface spreading partly from the slit 121 on an opening side of the slit 121. The ring portion 15 is provided at positions facing openings of the slit 121 opened radially with the through-holes 15a, as shown in FIG. 6.

(2) A wedge rod 125 is pushed against the taper surface 122 of the pin 120 from a side opposite to an inserting side of the pin 120. The pin 120 and the wedge rod 125 constitute the blocking member. The wedge rod 125 is provided at an end thereof with a taper surface 126 whose inclination angle is approximately similar to that of the taper surface 122 of the pin 120. As the taper surface 126 of the wedge rod 125 is pushed against the taper surface 122 of the pin 120, the pin 120 receives force acting in a direction of pushing and spreading radially outwardly the pin 120 so that a leakage of resin from the through-holes 15a is prevented.

According to the method of manufacturing the inner circumference spool 21 mentioned above, the blocking member serves to close the through-holes 15a to prevent the resin for forming the inner circumference spool 21 from being leaked from the trough-holes 15. Accordingly, the resin never disturbs a reciprocal movement of the plunger 17. Further, the blocking member not only closes the through-holes 15a but also supports the thin thickness ring portion 15 from an inside thereof so that the ring portion 15 is prevented from deforming due to pressure to be generated when the resin hardens.

The method of manufacturing the inner circumference spool 21 mentioned above is applicable not only to the first embodiment in which the through-holes 15a are formed in the ring portion 15 but also any of second to fifth embodiments hereinafter.

(Second Embodiment)

Figure 7:
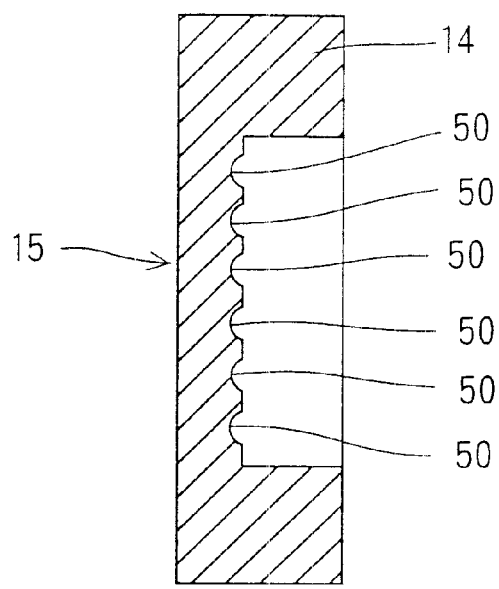
FIG. 7 is an enlarged cross sectional view of a ring portion according to a second embodiment of the present invention.

A second embodiment of the present invention is described with reference to FIG. 7. Substantially same structure and portions as the first embodiment are affixed with the same reference numbers thereof.

According to the second embodiment, an outer circumferential wall of the ring portion 15 has a plurality of recesses 50. The recesses 50 are formed by laser radiation, form rolling or press working. The recesses 50 on the thin thickness ring portion 15 serves to reduce a magnetic circuit area and to enlarge a magnetic resistance.

(Third Embodiment)

Figure 8:
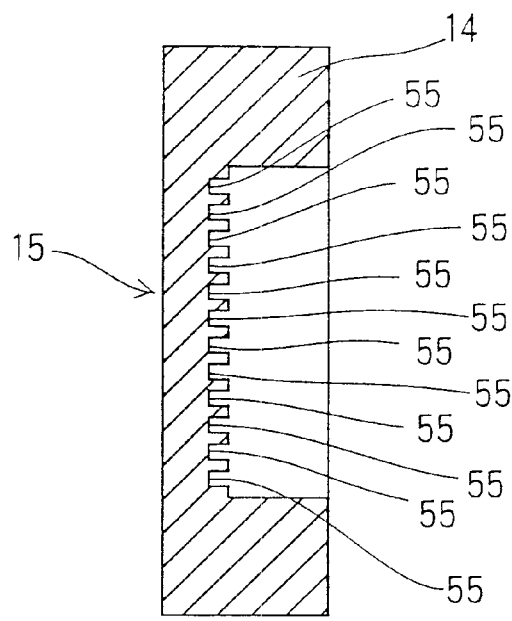
FIG. 8 is an enlarged cross sectional view of a ring portion according to a third embodiment of the present invention.

A third embodiment of the present invention is described with reference to FIG. 8. Substantially same structure and portions as the first embodiment are affixed with the same reference numbers thereof. According to the third embodiment, an outer circumferential wall of the ring portion 15 has a plurality of ring shaped grooves 55. The ring shaped grooves 55 are formed by laser radiation, machining or form rolling. The ring shaped grooves 55 on the thin thickness ring portion 15 serves to reduce a magnetic circuit area and to enlarge a magnetic resistance.

In the first to third embodiments mentioned above, instead of forming the thin thickness ring portion 15 by machining the outer circumference thereof, the thin thickness ring portion 15 may be formed by machining an inner circumference thereof. Further, in the second or third embodiment, instead of forming the recesses 50 or the ring shaped grooves 55 on the outer circumference of the ring portion 15, the recesses 50 or the ring shaped grooves 55 are formed on an inner circumference or on both of inner and outer circumferences of the ring portion 15.

(Fourth Embodiment)

Figure 9:
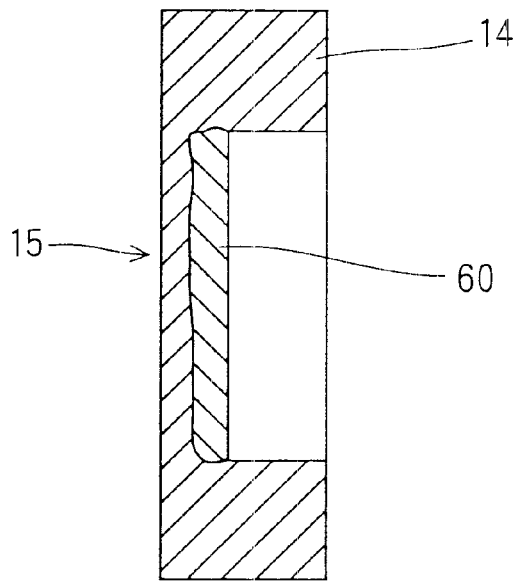
FIG. 9 is an enlarged cross sectional view of a ring portion according to a fourth embodiment of the present invention.

A fourth embodiment of the present invention is described with reference to FIG. 9. Substantially same structure and portions as the first embodiment are affixed with the same reference numbers thereof. A non-magnetic diffusion layer 60 is provided in the thin thickness ring portion 15 by diffusing non-magnetic material to an outer circumference thereof to enlarge the magnetic resistance of the ring portion 15. As the non-magnetic material is not diffused to an inner circumference of the ring portion 15, an inner circumferential surface of the ring portion 15, which is in slidable contact with the movable element, is prevented from becoming rough. Accordingly, the movable element smoothly moves in the ring portion 15. The following methods may be contemplated for diffusing the non-magnetic material to the ring portion 15.

(1) To diffuse non-magnetic material in a gas environment by laser radiation.

(2) To diffuse solid-state non-magnetic material by laser radiation.

(3) To diffuse non-magnetic material in a gas environment by shot blast.

(4) To diffuse non-magnetic material by melting injection.

(Fifth Embodiment)

Figure 10:
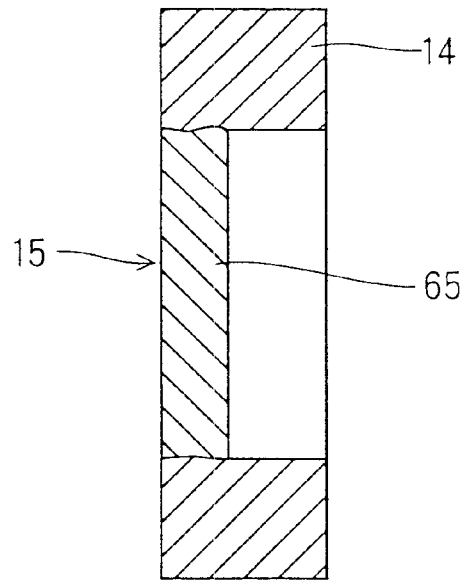
FIG. 10 is an enlarged cross sectional view of a ring portion according to a fifth embodiment of the present invention.

A fourth embodiment of the present invention is described with reference to FIG. 10. Substantially same structure and portions as the first embodiment are affixed with the same reference numbers thereof. According to the fifth embodiment, a non-magnetic portion 65 is formed to enlarge the magnetic resistance in the thin thickness ring shaped portion 15 by inducing strains in metallographical structure of the ring portion 15. The following methods may be contemplated for inducing the strains in metallographical structure of the ring portion 15.

(1) To induce strains based on work hardening by form rolling.

(2) To induce strains based on work hardening by press working.

(3) To induce strains based on resin pressure to be generated when the coil is fixed by resin.

(4) To induce strains based on heat by laser radiation.

According to the embodiments mentioned above, as the housing and attracting portions 14 and 16 of the fixed core are integrally provided, the redial air gap between the plunger 17 and the fixed element is small to a minimum extent. Further, as the thin thickness ring portion 15 has means for enlarging magnetic resistance as mentioned in the above embodiments, magnetic flux flowing directly between the housing and attracting portions 14 and 16 is limited. Accordingly, the attracting force to the plunger increases without enlarging the body of the electromagnetic driving device or the fluid control valve. Furthermore, even if the thickness of the ring portion is thicker, compared with that of the conventional ring portion by which the magnetic resistance is enlarged, the ring portion of the present invention can secure the same magnetic resistance as the conventional ring portion. Moreover, the thicker ring portion serves to increase the mechanical strength of the ring portion, which prevents the housing portion from being damaged.

In the embodiments mentioned above, instead of making the thickness of the ring portion 15, the ring portion 15 may be provided without forming the thin portion thereof by adjusting (1) a total number and each diameter of the through-holes, (2) a total number, each depth and each largeness of the recesses 50, (3) a total number, each width and each depth of the ring shaped grooves 55, (4) depth by which the non-magnetic material is diffused or (5) largeness of the strains.

The electromagnetic driving device of the present invention is applicable not only to the electromagnetic driving apparatus having the spool type hydraulic control valve but also to any other type of electromagnetic driving apparatus having fluid control valve or device in which the attracting force to the movable element is larger without enlarging the body thereof.

What is claimed is:

1. An electromagnetic driving device comprising;
    a coil;
    a movable element; and
    a fixed element having a housing portion in which the movable element is housed to reciprocatingly move, and an attracting portion toward which the movable element is attracted by magnetic flux to be generated upon energizing the coil,
    wherein the housing portion is provided at a position thereof radially opposed to the movable element with a ring portion connected with the attracting portion so that the housing portion and the attracting portion are formed into an integrated piece, and
    the ring portion is provided with at lease one through-hole radially penetrating a wall of the ring portion, the at least one through-hole restricting direct flow of the magnetic flux between the housing portion and the attracting portion so magnetic flux flows via the moveable element between the housing portion and the attracting portion.

2. An electromagnetic driving device according to claim 1, wherein a thickness of the wall of the ring portion is thinner than that of a part of the housing portion axially adjacent thereto.

3. A fluid control valve having the electromagnetic driving device according to claim 1, further comprising:
    a cylindrical housing having a plurality of ports through which fluid flows;
    a spool being reciprocatingly moved in the cylindrical housing along with the movable element for adjusting amounts of fluid flowing through the respective ports; and a biasing mechanism for urging the spool in an opposite direction to a direction in which the movable element is attracted to the attracting portion.

4. An electromagnetic driving device according to claim 1, wherein the at least one through-hole comprises a plurality of holes provided at the wall of the ring portion to narrow and limit a wall area of the ring portion through which the magnetic flux passes between the housing portion and the attracting portion.

5. An electromagnetic driving device according to claim 1, wherein, on energizing the coil, while the magnetic flux flows between the housing portion and the movable portion, the magnetic flux flows between the axial end outer circumference of the movable element on a side of the attracting portion and a part of the attracting portion axially adjacent the ring portion.

* * * * *